United States Patent
Kadambi et al.

(10) Patent No.: US 11,645,556 B2
(45) Date of Patent: May 9, 2023

(54) GENERATING SOFTWARE SERVICES FOR A SOFTWARE SOLUTION DETERMINED FROM ANALYSIS OF UNSTRUCTURED TEXT INPUT USING MACHINE LEARNING

(71) Applicant: International Business Machines Corporation, Armonk, NY (US)

(72) Inventors: Balaji Kadambi, Bengaluru (IN); Shikha Maheshwari, Bengaluru (IN); Manjula G. Hosurmath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 16/723,528

(22) Filed: Dec. 20, 2019

(65) Prior Publication Data
US 2021/0192366 A1 Jun. 24, 2021

(51) Int. Cl.
*G06N 5/04* (2023.01)
*G06F 16/332* (2019.01)
(Continued)

(52) U.S. Cl.
CPC .............. *G06N 5/04* (2013.01); *G06F 8/30* (2013.01); *G06F 16/3329* (2019.01);
(Continued)

(58) Field of Classification Search
CPC ...... G06F 8/30; G06F 16/3329; G06F 40/242; G06F 40/289; G06N 5/04; G06N 20/00
(Continued)

(56) References Cited

U.S. PATENT DOCUMENTS 10,282,468 B2 5/2019 Kim et al.
2018/0139308 A1 5/2018 Andrews et al.
(Continued)

FOREIGN PATENT DOCUMENTS

CN 101944016 A 1/2011

OTHER PUBLICATIONS

B. R. Bryant, et al., "From Natural Language Requirements to Executable Models of Software Components", Jun. 2004, http://citeseerx.ist.psu.edu/viewdoc/download?doi=10.1.1.1029.4545&rep=rep1&type=pdf, 9 pages.
(Continued)

*Primary Examiner* — Wei Y Zhen
*Assistant Examiner* — Mohammed N Huda
(74) *Attorney, Agent, or Firm* — Edell, Shapiro & Finnan, LLC

(57) ABSTRACT

Methods, systems and computer readable media are provided for automating software service analysis. One or more dictionaries are created, characterizing one or more software services available within the computing domain, wherein the one or more dictionaries each comprise at least an input category, a processing capability category, and an output category. A query input comprising a description of software service is received. Relevant portions are extracted using natural language processing of the query input that correspond to functions and associated parameters of the requested software services. The relevant portions of the query input are assigned to the one or more sub-categories in the dictionaries to generate mapped services. The sub-category assignments are processed to determine the mapping of the available software services within the computing domain.

14 Claims, 13 Drawing Sheets

(51) Int. Cl.
  *G06N 20/00* (2019.01)
  *G06F 40/242* (2020.01)
  *G06F 40/289* (2020.01)
  *G06F 8/30* (2018.01)
(52) U.S. Cl.
  CPC .......... *G06F 40/242* (2020.01); *G06F 40/289* (2020.01); *G06N 20/00* (2019.01)
(58) Field of Classification Search
  USPC .......................................................... 706/15
  See application file for complete search history.

(56) References Cited

U.S. PATENT DOCUMENTS

| | | | |
|---|---|---|---|
| 2018/0341885 A1 | 11/2018 | Kaulgud et al. | |
| 2019/0066008 A1* | 2/2019 | Gray-Donald et al. | H04L 67/10 |
| 2020/0250571 A1* | 8/2020 | Almasan et al. | G06N 5/04 |
| 2021/0132933 A1* | 5/2021 | Thakkar et al. | G06N 20/00 |
| 2021/0141833 A1* | 5/2021 | Davis et al. | G06N 20/00 |

OTHER PUBLICATIONS

G. Cabral, et al., "Automated Formal Specification Generation and Refinement from Requirement Documents", http://www.scielo.br/scielo.php?script=sci_arttext&pid=S0104-65002008000100008, J Braz Comp Soc 14, 87-106 (2008) doi:10.1007/BF03192554, 20 pages.
A. Bucchiarone, et al., "From Requirements to Java code: an Architecture-centric Approach for producing quality systems", arXiv preprint arXiv:0910.0493 (2009), https://arxiv.org/ftp/arxiv/papers/0910/0910.0493.pdf, 10 pages.
K. Benghazi, et al., "Real-time Web Services Orchestration and Choreography", CAiSE 2010 Workshop EOMAS'10, Hammamet, Tunisia, http://ceur-ws.org/Vol-601/EOMAS10_paper13.pdf, 12 pages.

* cited by examiner

| Subcategory | Parameters | Co-location criteria | Co-location criteria for mapping across sub-categories | Service mapping criteria to a query input |
|---|---|---|---|---|
| OCR_Input_Language | "English", "Spanish", "German" | 4 sentences | 10 sentences | Perform mapping if two of the three sub-categories is mapped to the keywords and phrases extracted from the query input |
| OCR_Input_Formatar | "png", "jpeg", "pdf", "scanned image", "scanned document", "image with text" | 4 sentences | 10 sentences | Perform mapping if two of the three sub-categories is mapped to the keywords and phrases extracted from the query input |
| OCR_Processing_Capability | "extract text from image", "ocr", "extracted"&&"text"()0 -- must be in the same sentence)," extract"&&"text"()0, "extract"&&"content"()1, "analysis (this word should not be there in the requirement | 4 sentences | 10 sentences | Perform mapping if two of the three sub-categories is mapped to the keywords and phrases extracted from the query input |
| OCR_Output_Text | "text" | 4 sentences | 10 sentences | Perform mapping if two of the three sub-categories is mapped to the keywords and phrases extracted from the query input |

FIG. 4

| Subcategory | Parameters | Co-location criteria | Co-location criteria for mapping across sub-categories | Service mapping criteria to a query input |
|---|---|---|---|---|
| LT_Input_Language | "English", "Spanish", "German", "text" | 3 sentences | 6 sentences | Perform mapping if two of the three sub-categories is mapped to the keywords and phrases extracted from the query input |
| LT_Processing_Capability | "translate", "translation" | 3 sentences | 6 sentences | Perform mapping if two of the three sub-categories is mapped to the keywords and phrases extracted from the query input |
| LT_Output_Language | "English", "Spanish", "German" | 3 sentences | 6 sentences | Perform mapping if two of the three sub-categories is mapped to the keywords and phrases extracted from the query input |

FIG.5

| Subcategory | Keywords | Co-location criteria | Co-location criteria for mapping across sub-categories | Service mapping criteria to a query input |
|---|---|---|---|---|
| NLU_Input_Language | "English" | 4 sentences | 10 sentences | Perform mapping if two of the three sub-categories is mapped to the keywords and phrases extracted from the query input |
| NLU_Input_Formatar | "text", "plain text", "english text" | 4 sentences | 10 sentences | Perform mapping if two of the three sub-categories is mapped to the keywords and phrases extracted from the query input |
| NLU_Processing_Capability | "natural language processing", "nlp" | 4 sentences | 10 sentences | Perform mapping if two of the three sub-categories is mapped to the keywords and phrases extracted from the query input |
| NLU_Output_Text | "concepts", "entities", "keywords", "categories", "sentiment", "emotion", "relations", "semantic roles" | 4 sentences | 10 sentences | Perform mapping if two of the three sub-categories is mapped to the keywords and phrases extracted from the query input |

FIG.6

| Subcategory | Keywords | Co-location criteria | Co-location criteria for mapping across sub-categories | Service mapping criteria to a query input |
|---|---|---|---|---|
| WIoT_Input | "sensor", "device", "gateway", "equipment", "sensor" && "data" | 4 sentences | 10 sentences | Perform mapping if two of the three sub-categories is mapped to the keywords and phrases extracted from the query input |
| WIoT_Processing_Capability | "IoT", "Store" && "sensor" && "data" | 4 sentences | 10 sentences | Perform mapping if two of the three sub-categories is mapped to the keywords and phrases extracted from the query input |
| WIoT_Output | "real-time" && "sensor" && "data", "sensor data analysis", "real-time" && "data" | 4 sentences | 10 sentences | Perform mapping if two of the three sub-categories is mapped to the keywords and phrases extracted from the query input |

FIG.7

| Subcategory | Keywords | Co-location criteria | Co-location criteria for mapping across sub-categories | Service mapping criteria to a query input |
|---|---|---|---|---|
| WIoT_Input | "sensor data", "data", "structured data" | 4 sentences | 10 sentences | Perform mapping if two of the three sub-categories is mapped to the keywords and phrases extracted from the query input |
| WIoT_Processing_Capability | "predictive analytics", "prediction", "machine learning model", "machine learning" | 4 sentences | 10 sentences | Perform mapping if two of the three sub-categories is mapped to the keywords and phrases extracted from the query input |
| WIoT_Output | "score", "predict", "prediction", "equipment failure prediction", "predict" && "failure" | 4 sentences | 10 sentences | Perform mapping if two of the three sub-categories is mapped to the keywords and phrases extracted from the query input |

FIG. 8

GENERATING SOFTWARE SERVICES FOR A SOFTWARE SOLUTION DETERMINED FROM ANALYSIS OF UNSTRUCTURED TEXT INPUT USING MACHINE LEARNING

BACKGROUND

1. Technical Field

Present invention embodiments relate to generating software services using machine learning systems to generate solutions for software requirements, and in particular, to analyzing text-based software requirements, provided as input, using natural language processing based on a corpus of re-usable software services and to determine which re-usable software services may be used for the requested software requirements using machine learning.

2. Discussion of the Related Art

Organizations typically offer many re-usable software services which may be integrated to create a software solution to address evolving business needs. Re-usable services may be arranged in particular manners to meet particular business needs.

When a business need is identified, the process of designing and implementing a software solution for the need is performed manually. For example, the process of determining solution requirements, translating the solution requirements into a solution architecture, and identifying corresponding software services to perform the desired functionality often takes weeks. Solution requirements are examined by a subject matter expert having knowledge of available software services and whether a specific service can perform a specific function. Based on this information, the subject matter expert generates a list of essential services, and once the services are identified, a solution architecture can be designed to support the solution to be built.

The process of determining whether an existing services ecosystem is capable of solving a business or corporate need generally takes days or weeks. Moreover, this process is prone to user error and inefficient.

SUMMARY

According to embodiments of the present invention, methods, systems, and computer readable media are provided for automatically determining whether a requested solution may be built from one or more existing software services. Re-usable software services may be integrated to solve particular functional needs in an automated manner. Once obtained, these services may be mapped into a set of requirements to drive solution architecture.

Methods, systems and computer readable media are provided for software service analysis, in some aspects, in an automated manner. One or more dictionaries are created, characterizing one or more software services available within a computing domain, wherein the one or more dictionaries each comprise at least an input category, a processing capability category, and an output category for every software service. A query input comprising a description of requirements is received. Relevant portions are extracted using natural language processing of the query input that correspond to functions and associated parameters of the requested software services. The relevant portions are assigned to the one or more dictionaries to generate mapped services. These techniques may be used to translate a requirement into a solution based upon functionality of existing services.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

FIG. 4 is an example dictionary for an optical character recognition software service for the automated software service analysis system, according to an embodiment of the present invention.

FIG. 5 is an example dictionary for a language translation software service for the automated software service analysis system, according to an embodiment of the present invention.

FIG. 6 is an example dictionary for a natural language unit for the automated software service analysis system, according to an embodiment of the present invention.

FIG. 7 is an example dictionary for an internet of things software service for the automated software service analysis system, according to an embodiment of the present invention.

FIG. 8 is an example dictionary for a machine learning software service for the automated software service analysis system, according to an embodiment of the present invention.

DETAILED DESCRIPTION

Methods, systems, and computer readable media are provided for automatic analysis of software services to determine whether existing software services may be integrated to generate new functionality to meet emerging software solution needs. The techniques provided herein provide an efficient and dynamic way of determining software services from a corpus of re-usable software services to determine whether new software functionality can be constructed based on available services. The software requirements are provided by a user in an unstructured text-based format, for example, in the form of a query. The system evaluates existing software services to determine whether the existing services can support the requested software need. In the event that the solution for the requested need cannot be constructed based on the existing services, gaps in existing software services are identified and provided to the user. Machine learning techniques (including natural language processing) may be used to formulate a query and map the query input to software services. Feedback may be provided to the system to improve the quality of dictionaries.

Figure 1:
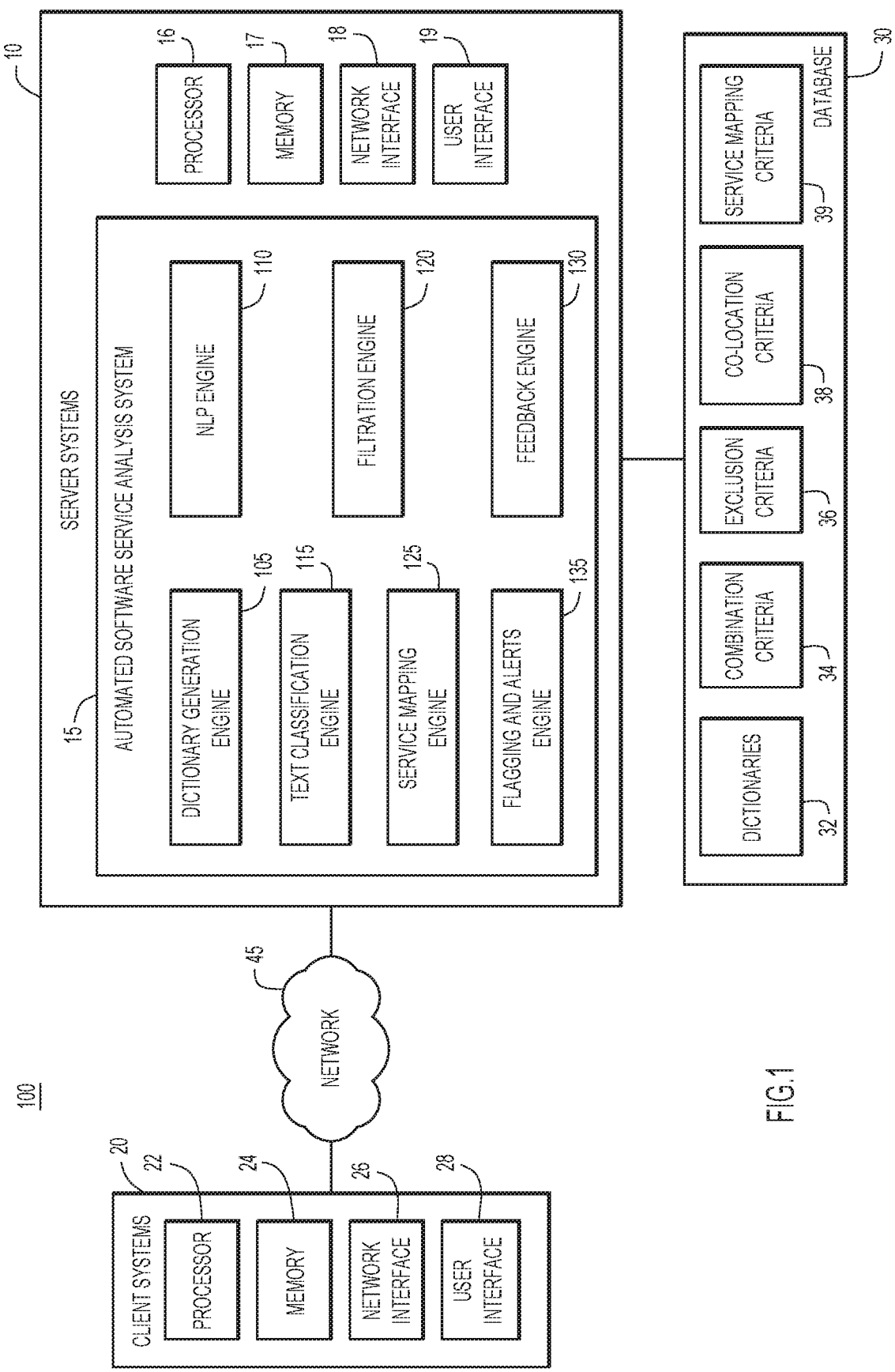
FIG. 1 is a diagrammatic illustration of an example computing environment for automated software service analysis according to an embodiment of the present invention.

An example environment for use with present invention embodiments is illustrated in FIG. 1. Specifically, the environment includes one or more server systems 10, one or more client or end-user systems 20, a database 30, and network 45. Server systems 10 and client systems 20 may be remote from each other and may communicate over a network 45. The network may be implemented by any number of any suitable communications media, such as a wide area network (WAN), a local area network (LAN), Internet, Intranet, etc. Alternatively, server systems 10 and client systems 20 may be local to each other, and may communicate via any appropriate local communication medium, such as local area network (LAN), hardwire, wireless link, Intranet, etc.

Client systems 20 enable users to submit unstructured input comprising requested software services to server systems 10 for automated software service analysis. The server systems 10 include an automated software service mapping system 15 comprising a dictionary generation engine 105, a natural language processing (NLP) engine 110, a text classification engine 115, a filtration engine 120, a service mapping engine 125, a feedback engine 130, and a flagging and alerts engine 135, as described herein.

A database 30 may store various information for the analysis, such as dictionaries 32, combination criteria 34, exclusion criteria 36, co-location criteria 38, service mapping criteria 39 etc. The dictionaries 32 may contain labeled information (e.g., in a table format, in a tab-delimited format, or other structured format, etc.) used by automated software service analysis system 15 to determine whether one or more existing software services may be integrated to provide the requested software solution. Examples of dictionaries are provided in FIGS. 4-8.

The database 30 may also store various criteria for generating the dictionaries including combination criteria 34, exclusion criteria 36, co-location criteria 38, and service mapping criteria 39. Combination criteria 34 may include terms that may be combined to describe the capabilities of a service. Exclusion criteria 36 may include terms that may be combined to describe the capabilities that a software service does not have. Co-location criteria 38 may include terms that specify proximity of one term to another term in order to form accurate mappings. Service mapping criteria 39 may include terms that specify the combination of categories to form accurate service mappings.

The database system 30 may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface, such as a GUI, etc., or other interface, such as command line prompts, menu screens, etc., to solicit information from users pertaining to the input software service query, and may provide reports including whether existing software services may be integrated to provide requested software services as ascertained by the system.

Server systems 10 and client systems 20 may be implemented by any conventional or other computer systems preferably equipped with a display or monitor, a base (including at least one hardware processor (e.g., microprocessor, controller, central processing unit (CPU), etc.), one or more memories and/or internal or external network interfaces or communications devices (e.g., modem, network cards, etc.), optional input devices (e.g., a keyboard, mouse or other input device), and any commercially available and custom software (e.g., server/communications software, automated software service analysis system software, browser/interface software, etc.). By way of example, the server/client includes at least one processor 16, 22 one or more memories 17, 24 and/or internal or external network interfaces or communications devices 18, 26 such as a modem or network cards, and a user interface 19, 28 etc. The optional input devices may include a keyboard, mouse, or other input device.

Alternatively, one or more client systems 20 may perform automated software service analysis as a stand-alone unit. In a stand-alone mode of operation, the client system stores or has access to the data, such as dictionaries 32, combination criteria 34, exclusion criteria 36, co-location criteria 38, and service mapping criteria 39. The stand-alone unit includes automated software service analysis system 15. The graphical user or other interface 19, 28, such as a GUI, command line prompts, menu screens, etc., solicits information from a corresponding user pertaining to the input requested service.

Automated service mapping and analysis 15 may include one or more modules or units to perform the various functions of present invention embodiments described herein. The various modules, a dictionary generation engine 105, a NLP engine 110, a text classification engine 115, a filtration engine 120, a service mapping engine 125, a feedback engine 130, and a flagging and alerts engine 135, etc., may be implemented by any combination of any quantity of software and/or hardware modules or units, and may reside within memory 17 of the server for execution by processor 16. These modules are described in additional detail below. These engines operate in concert to identify software functionality for performing requested services. Existing software services from a repository of available services may be evaluated, e.g., via one or more dictionaries that describe functionality, and the requested software service may be mapped to existing services. A list of software services needed to generate the requested functionality is provided, and gaps in existing software services may be identified. Once this is established, system architecture may be designed and implemented. An administrator may install software to remedy gaps in existing software services.

Dictionary generation engine 105 constructs dictionaries for services available in the computing domain. A dictionary may comprise one or more of the following features: (synonymous) keywords/phrases, (conditional) combinations of keywords/phrases, exclusions of combinations of keywords/phrases that may be used to map a requirement (based on keywords/phrase(s), co-location criteria, and service mapping criteria 39) with improved accuracy. The subcategories defined in a dictionary for a software service are based on the inputs, outputs and processing capability of the software service.

Co-location criteria may be used to specify a range (e.g., a number of sequential sentences, e.g., 1, 2, 3, 4, 5, 6, 7, 8, 9, or 10 sentences or more) and a maximum distance between words to filter or reduce erroneous mappings. The co-location criteria may be specified at the level of combination or exclusion criteria for parameters, in regard to parameters mapping in a sub-category or across sub-categories. In some aspects, the dictionary generation engine 105 may provide an interface with which to create custom dictionaries for a software service. In other aspects, the dictionary generation engine receives feedback from feedback engine 130, and may update the corresponding dictionary.

Service mapping criteria may be used to specify the sub-categories in the dictionary to be assigned to a query input to determine if the service capabilities map to the requirement.

NLP engine 110 relies on natural language processing techniques to extract relevant portions of a query input, for example, in the form of unstructured text, that correspond to functions and associated parameters of the requested software services. NLP engine 110 may generate keywords and phrases with location (e.g., sentence number and word position) from the unstructured input suitable for assessing whether the dictionaries contain functionality to implement the requested services.

Text classification engine 115 may classify the extracted portions into respective subcategories of the one or more dictionaries. Classification into a subcategory and other associated parameters or criteria (e.g., sentence and word distance constraints, combinations, exclusions, etc.) provide for improved accuracy and reduce false mappings. In some cases, a spell correction algorithm may be used for extraction of keywords and phrases in the query input text. In cases in which an extracted relevant portion corresponds to a subcategory field of a dictionary, a match is made. In some cases, machine learning approaches may be used to classify the extracted portions into respective sub-categories of the dictionary.

Filtration engine 120 evaluates the results of the text classification engine and refines the classification based on parameters or constraints. For example, the filtration engine evaluates the results of classification, and removes classifications if co-location or other specified criteria are not met.

Service mapping engine 125 maps the requested functionality to existing services based on dictionary criteria. In general, the input query may not match every subcategory of a dictionary. In general, mapping may occur if a specified number of subcategories match the query input as specified in the service mapping criteria for the service in the dictionary. For example, if two of the subcategories of a service are identified/matched, then the software service may be mapped to the input query.

Feedback engine 130 accepts input from a user, and updates mappings based on feedback from a user. If a user ascertains that an incorrect mapping has been made, the user may provide exclusion criteria to the system, and the feedback engine evaluates all the dictionaries to remove any incorrect mappings based on feedback from a user. In some aspects, a user may ascertain that a mapping has been missed, and the user may provide a synonymous word or combination criteria to the system. The system may update all dictionaries based on this feedback from the user.

Flagging and alerts engine 135 may send out notifications to a user regarding missing functionality (e.g., functionality in the query input that was not mapped to a dictionary).

These features and others are described throughout the specification and figures.

Figure 2:
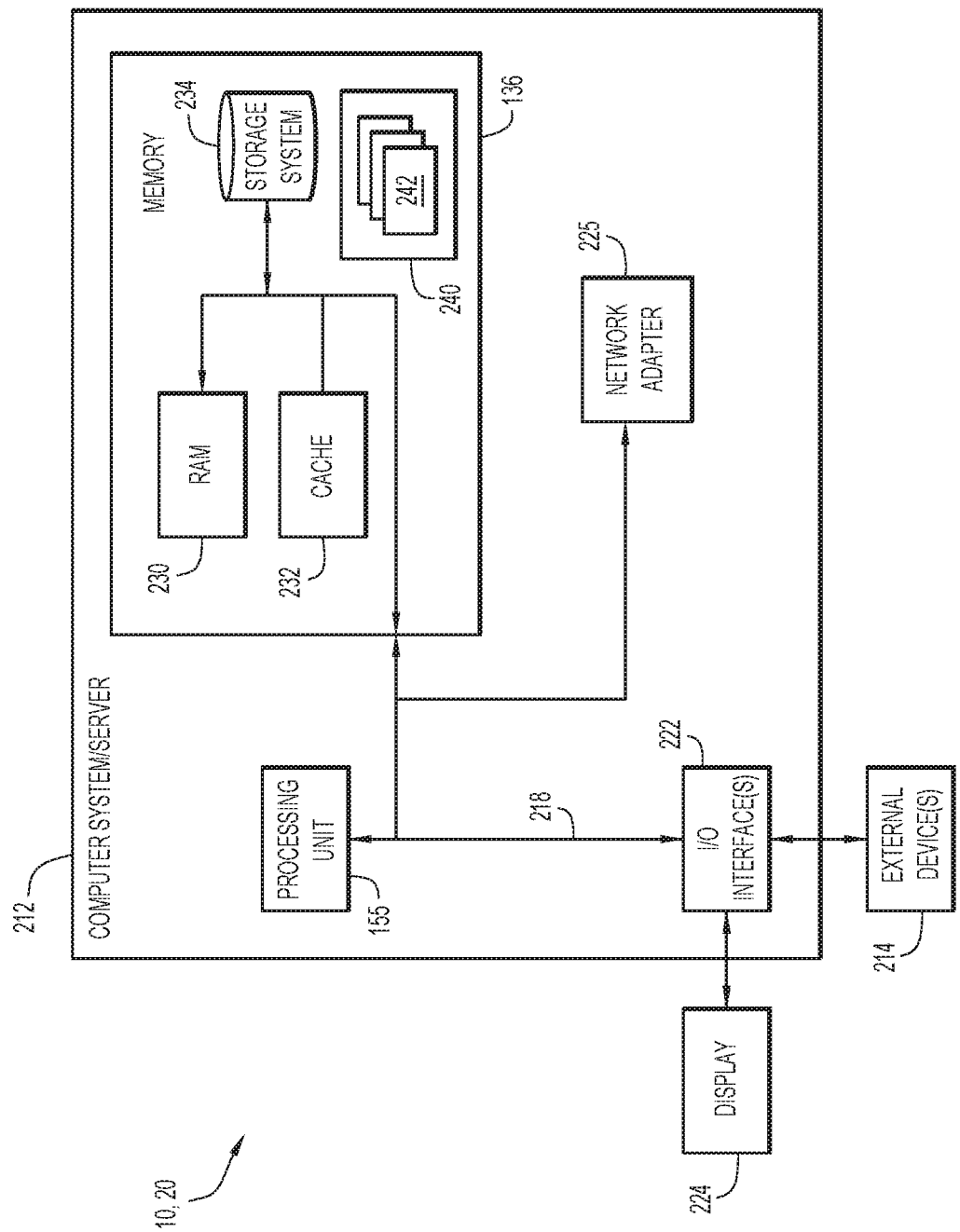
FIG. 2 is an example computing device for the computing environment of FIG. 1, according to an embodiment of the present invention.

Client systems 20 and server systems 10 may be implemented by any suitable computing device, such as computing device 212 shown in FIG. 2 for computing environment 100. This example is not intended to suggest any limitation as to the scope of use or functionality of embodiments of the invention described herein. Regardless, computing device 212 is capable of being implemented and/or performing any of the functionality set forth herein.

In the computing device, there is a computer system which is operational with numerous other general purpose or special purpose computing system environments or configurations. Examples of well-known computing systems, environments, and/or configurations that may be suitable for use with the computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules (e.g., automated software service analysis system 15 and its corresponding modules), being executed by a computer system. Generally, program modules may include routines, programs, objects, components, logic, data structures, and so on that perform particular tasks or implement particular abstract data types.

Computer system 212 is shown in the form of a general-purpose computing device. The components of computer system 212 may include, but are not limited to, one or more processors or processing units 155, a system memory 136, and a bus 218 that couples various system components including system memory 136 to processor 155.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 136 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 136 may include at least one program product having a set (e.g., at least one) of program modules that are configured to carry out the functions of embodiments of the invention.

Program/utility 240, having a set (at least one) of program modules 242 (e.g., automated software service analysis system 15 and corresponding modules, etc.) may be stored in memory 136 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 225. As depicted, network adapter 225 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3A:
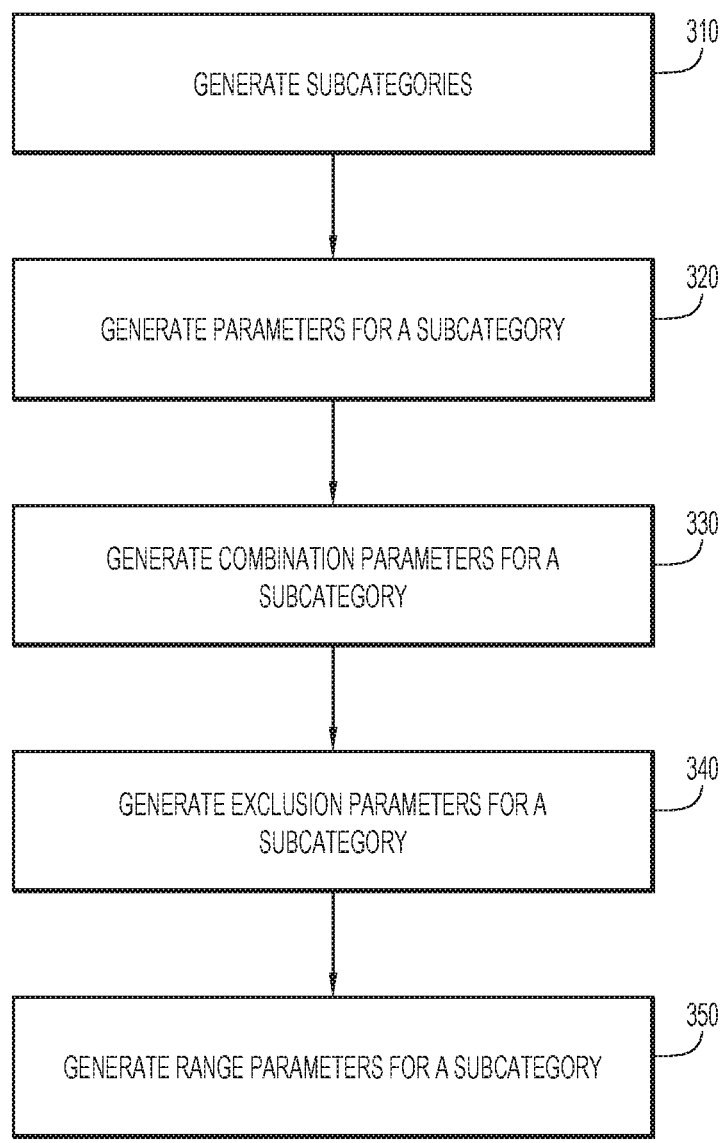
FIG. 3A is a flowchart showing example operations for constructing a dictionary, according to an embodiment of the present invention.

FIG. 3A is a flowchart for generating a dictionary. In general, at operation 310, a dictionary may be constructed to comprise several subcategories, including inputs, processing capabilities and outputs. The subcategories are evaluated against the query input, and when a sufficient number of subcategories are matched, a mapping may be formed to indicate that the existing software services may be integrated to meet the specified requested software solution functionality.

At operation 320, parameters for each subcategory may be generated. This approach enables more accurate mappings between a software service as defined by a dictionary and a query input. By using synonymous words or word combinations/phrases in the dictionary, a subcategory may be matched to a query term, even when the requirements do not mention the exact matching word. For example, a "scanned document" or "an image document" or "an image with text embedded" may each be matched to an input subcategory for a software service. This approach increases the accuracy of the mapping of existing software services to an input software service requirement. In some cases, machine learning approaches may utilize natural language processing to construct dictionaries having non-exact mappings between query inputs and existing software services available on the system.

Additionally, dictionaries may comprise combination and exclusion criteria. At operation 330, combination parameters may be generated for a subcategory. For example, a combination of words that each should be present may be specified using logical operators. For example, "extract" && "text" && "analyse" may represent a capability requirement for a software service that can extract text from documents. The requirement text may read as follows: "It is required to extract and analyse the text content." This approach reduces incorrect mappings.

At operation 340, exclusion parameters may be generated for a subcategory. Some services may be able to extract text but not analyse the text. In this case, it may be desirable to include exclusion criteria in dictionaries to exclude mappings when there are multiple requirements, such as both an extraction and an analysis requirement. In this case, to specify that a service only has extraction capabilities and not analysis capabilities, a dictionary entry for that service may be configured as "extract" && "text" && (!"analyse" !"analysis"). In this case, a match would be found when extraction and not analysis are needed.

At operation 350, range parameters may be generated for a service. For example, sentence and/or word range criteria may be used for a software service. As an example, the requirement for a service may be distributed across ten co-located sentences, and may be dependent on the service and the way the input software service requirements are written. As another example, co-location criteria may specify a maximum sentence and word separation between "extract" and "text" to accurately establish the requirement and map it to a subcategory.

Correct mappings may be established by ensuring that keywords and phrases that satisfy the co-location criteria are mapped to a service. Incorrect mappings may be reduced by ensuring that keywords and phrases that do not satisfy the co-location criteria are not mapped to the service. This criteria can be specified at the level of every service in the dictionary.

Further, any of the features described above, combination, exclusion, or co-location may be combined in a single entry in the dictionary. For example, combinations of keywords and phrases or exclusion of keywords and phrases, based on logical operators with co-location criteria (e.g., based on sentence number and keyword or phrase position within a sentence) may be included for mapping a service to a subcategory. Similarly, incorrect classifications may be identified and filtered or removed, based on sentence number and keyword or phrase position within a sentence, based on co-location of other keywords or phrases, etc. to mitigate incorrect mappings.

The above criteria may be combined to generate one or more dictionaries. In some aspects, the entries may be generated manually or semi-automatically. In other aspects, entries may be updated in an automated manner, based on feedback from the feedback engine.

Dictionaries may include any suitable number of subcategories, with each subcategory including synonymous keywords and phrases for mapping a service to a particular subcategory. In some cases, separate input software service requirements may be mapped to the same service.

Figure 3B:
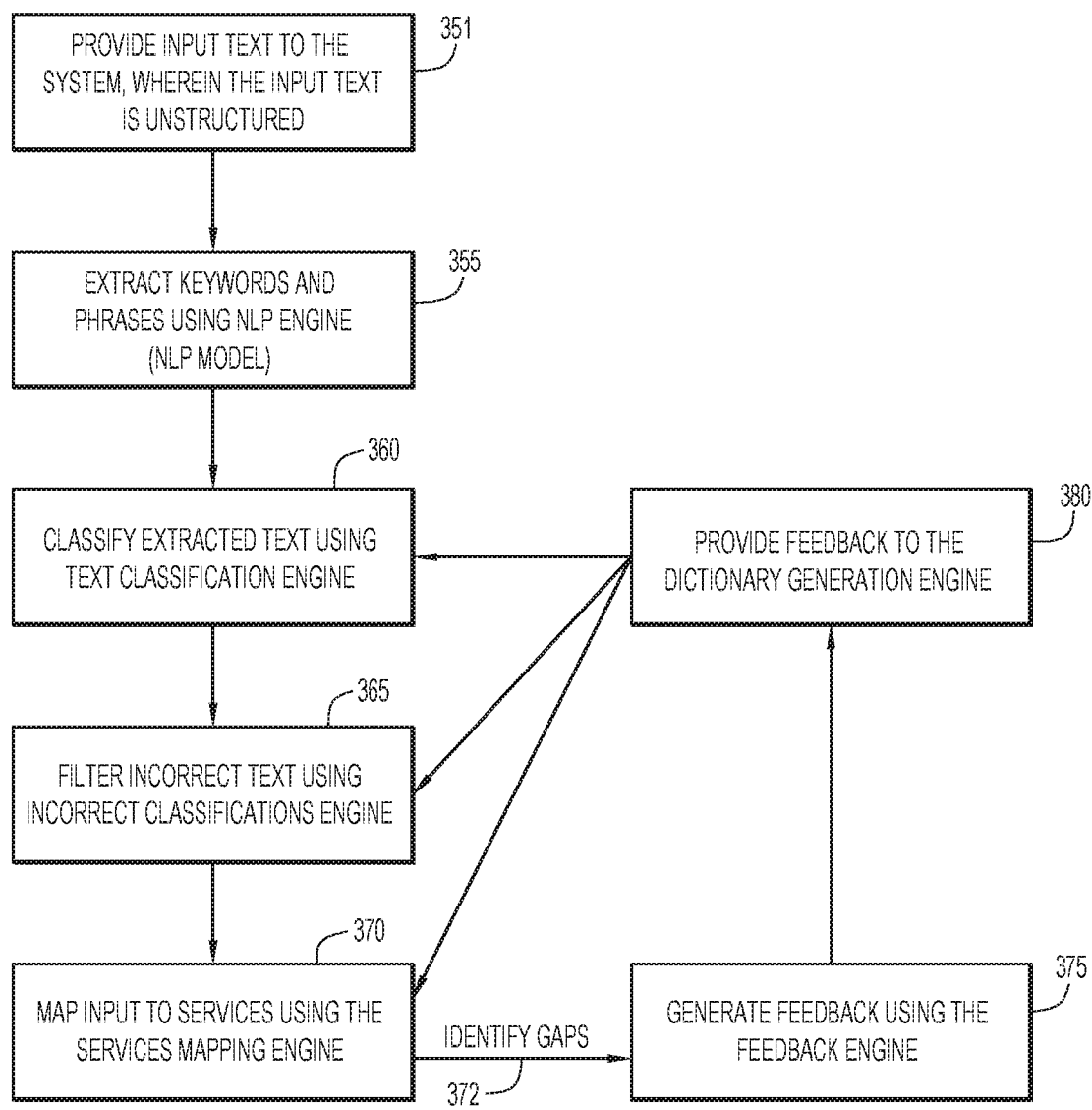
FIG. 3B is a flowchart showing example operations for analyzing unstructured input to determine available software services, according to an embodiment of the present invention.

FIG. 3B is a flowchart showing operations of system 15. In this flowchart, the dictionary has already been formulated based on FIG. 3A. The dictionary has subcategories for broad level categories (e.g., input, output, processing capabilities, etc.) for every service with characteristics as specified in the dictionary. These operations generate a list of all possible existing services. Unless indicated otherwise, matching refers to classification of a query term into a subcategory, e.g., using a machine learning based classifier.

Unless otherwise indicated, mapping indicates that the requested service(s) are available based on the existing services, which may be integrated.

At operation 351, input text is provided to the system, wherein the input text is in unstructured format. At operation 355, keywords and phrases are extracted by a NLP engine. The NLP engine extracts keywords and phrases that describe a requested software service. In some aspects, a custom NLP model may be trained for domain specific extraction of keywords and phrases. Spell check capabilities may be provided to improve accuracy.

Location information may be generated for each extracted keyword and phrase. The location information includes sentence number and position of the keyword or phrase within the sentence.

At operation 360, extracted text and phrases are classified using the text classification engine. In some aspects, the classification engine comprises machine learning capabilities to classify the keywords and phrases of the extracted text into subcategories of the dictionary, such as software service input, software service output, service processing capability, or a no match category (when it cannot be categorized based on the dictionary values).

A text similarity algorithm may be used to classify the text, without the need for exact matches to mitigate spelling mistakes as well as provide different ways to describe the same query term. In some cases, extracted text may be corrected for any spelling mistakes using spell correct algorithms. In some aspects, a score greater than a predefined threshold may indicate a match for the subcategory. The criteria for the match may be modified based upon the context to increase the accuracy of the mapping of services to a software requirement. In some cases, the criteria may be specified at the service level and may be different for every service provided by the NLP engine. The classification criteria may also change based upon the feedback provided.

In some aspects, for a classification that has combination criteria (e.g., multiple words), co-location criteria may be evaluated before the combination of keywords or phrases is classified. Exclusion criteria may be evaluated in a similar manner during classification. If a keyword or phrase cannot be classified, then it is assigned a "no match" category.

At operation 365, filter classification may be performed to remove false positives. Classifications that have keywords or phrases from sentences that do not satisfy co-location criteria (specified in the dictionary) with other keywords and phrases in the subcategory may be filtered, per subcategory. This operation removes errors from invalid matches, e.g., from identifying keywords or phrases at any position in the document, and generating a mapping for a service subcategory that is not valid. For example, an incorrect classification may occur when two parts of the document are referring to two different operations, and when combined, can map erroneously to a subcategory.

At operation 370, service mappings are generated to map input software service requirements to services using the services mapping engine, based on classifications. A criteria to map a service based on the classifications may be defined at the service level, to increase the accuracy of mapping. As an example of a processing capability match, the software service may be mapped or both the input and output may match. Service capabilities may also be validated based upon co-location criteria for that service. Thus, a service may be mapped to a requirement based on co-location criteria specified in the dictionary, and/or mapping criteria for services based on subcategory classifications as specified in the dictionary.

At operation 372, gaps in existing services are identified and provided, allowing rapid identification of needed solutions. If mapping is completed, and a gap is identified, several options are available. The input may be evaluated to determine if NLP should be expanded to include additional terms. The dictionary for an existing service may need to be updated. Information may be incomplete in the requested service. Alternatively, an output transformation may be needed to map the output to a different form. In this case, gaps may be resolved by providing additional information or transforming the data.

If there are keywords/phrases that do not map to any service input, output or processing capability, this may be identified as a gap, and a new service, not provided within the current infrastructure, may be needed. In this case, gaps in services may be identified based on "no match" keywords/phrases.

At operation 375, feedback is generated by the feedback engine, and this feedback may be provided to the dictionary to include more keywords or phrases or word combinations based on validation. Feedback may also be provided to the filtering criteria at operation 365 and service mapping criteria at operation 370 (or any other engine, as needed) for each of the services during validation. At operation 380, feedback may be provided to the dictionary generation engine.

FIG. 4 shows an example dictionary of optical character recognition (OCR) software service that is used to extract the text content from images. For the OCR software service, the dictionary includes subcategories of functions of the OCR software service along with parameters which specify characteristics of each subcategory of software services. OCR functionality may be divided into a plurality of different categories, including input languages, input formats, processing capabilities, and output text comprising the translated text. Further, for the subcategory OCR input languages, parameters may specify that the languages of English, Spanish and German are accepted as input languages. For the subcategory of OCR input format, parameters may specify the types of input files that the OCR software can read (e.g., png, jpeg, jpg, pdf, scanned image, scanned document, image with text). OCR processing capabilities parameters detail the processing capabilities, e.g., extracting text from an image using OCR, extracting text in the same sentence, etc. Additionally, features that should not be present in the requirement (e.g., analysis) may be specified. For the subcategory of OCR output text, the parameters may specify that the output is in machine readable text. In this example, co-location criteria across sub-categories is ten sentences. All the parameters mapped to a service sub-category are not to be more than ten sentences apart. Service mapping criteria for the software service specifies that the service can be mapped to a query input if two of the three sub-categories described is mapped to the keywords and phrases extracted from the query input.

As used herein, for a given set of words and/or phrases, the term "relevant" refers to a co-location of the words and/or phrases in a document meeting a co-location criteria. Co-location criteria may specify the maximum distance between relevant words and/or phrases in the input query text. For example, if a document contains the terms English, Spanish and German scattered throughout a document (for example, not present within four sentences as specified for co-location), the mapping should be removed, as this likely does not correspond to languages for translation.

In general, the input software service query may not match every subcategory of a dictionary. In general, mapping may occur if a specified number of subcategories match the query input. For example, if two of the subcategories of the OCR dictionary are identified/matched, then a software service (OCR) may be mapped to the input software service query based on the service mapping criteria. More specifically, if two of the three categories, software service input, software service processing capability and software service output are matched to the query, then mapping may proceed to indicate that the software service contains the queried functionality.

FIGS. 5-8 show additional examples of preparing a dictionary for querying of software services. In FIG. 5, a dictionary for a language translator software service is shown. For example, the subcategory indicates that the language translator may accept as input languages, English, Spanish, or German in the form of text. The processing capability of the language translator is to translate the input into a determined language. The software service provides as output, an English, Spanish or German translation in the form of text. The co-location criteria may range from 1, 2, 3, 4, 5, 6, or more sentences. For example, if the input software service query contains a phrase corresponding to translation and the target languages are within three sentences, the language translator may be mapped to the services. In some cases, a match of two of the three subcategories is sufficient for a mapping of the language translator by the services mapping engine. In other cases, a mapping may be made with one match, and the filtration engine may refine mappings as provided herein.

In this example, co-location criteria across sub-categories is six sentences. All the parameters mapped to a service sub-category are not to be more than six sentences apart. Service mapping criteria for the software service specifies that the service can be mapped to a query input if two of the three sub-categories described is mapped to the keywords and phrases extracted from the query input.

FIG. 6 shows dictionaries for Natural Language Understanding (NLU), which relies on advanced NLP to analyse text and extract meta-data from content. The NLU system may utilize custom annotation models to identify industry/domain-specific entities and relationships in unstructured text. In this example, the NLU accepts the English language as input, in a variety of text formats, performs NLP on the text, and generates an output comprising content based on the NLP processing. The content may include one or more of concepts, entities, keywords, categories, sentiment, emotion, relations, and semantic roles or any combination thereof. The same co-location criteria as used in the OCR dictionary may also be specified here.

FIG. 7 shows another dictionary, in this case, the Internet of Things (IoT) software services platform. This software service provides a hub for IoT connected devices, allowing communication with and data consumption from networked devices. As specified in the dictionary, IoT connected devices may include sensors, devices, gateways or other equipment capable of providing data to a centralized server, e.g., directly or through a gateway. The IoT processing capabilities may include storage of data from sensors and other devices. In some cases, the IoT service may provide real-time sensor data as output or to other software services for further processing.

This platform provides a user with a built-in web console dashboard to monitor IoT data and to analyse this data in real-time. The IoT platform may be enhanced and customized by building and connecting other software services to this platform, which may include custom applications, by using messaging and Representational State Transfer (REST) Application Programming Interfaces (APIs). Co-location criteria may also be provided as previously discussed.

FIG. 8 shows another example dictionary, in this case, a machine learning service platform dictionary. This dictionary corresponds to a machine learning service platform, which may be a full-service cloud offering, allowing developers and data scientists to collaborate to integrate predictive capabilities with their software services. In some aspects, the machine learning service is a set of REST APIs that may be called from any programming language to apply machine language based techniques in decision making, solving technical problems, and improving user outcomes. In this case, the machine learning system may receive input from sensors, formatted as data or structured data. The MLS software may apply predictive analytics and/or machine learning techniques to produce an output. The output may be in the form of a score, prediction, or equipment failure prediction.

These dictionaries are not intended to be limited by the example subcategories and parameters provided herein. It is understood that additional subcategories and parameters may be used to describe the functionality of these software services and other software services.

Figure 9:
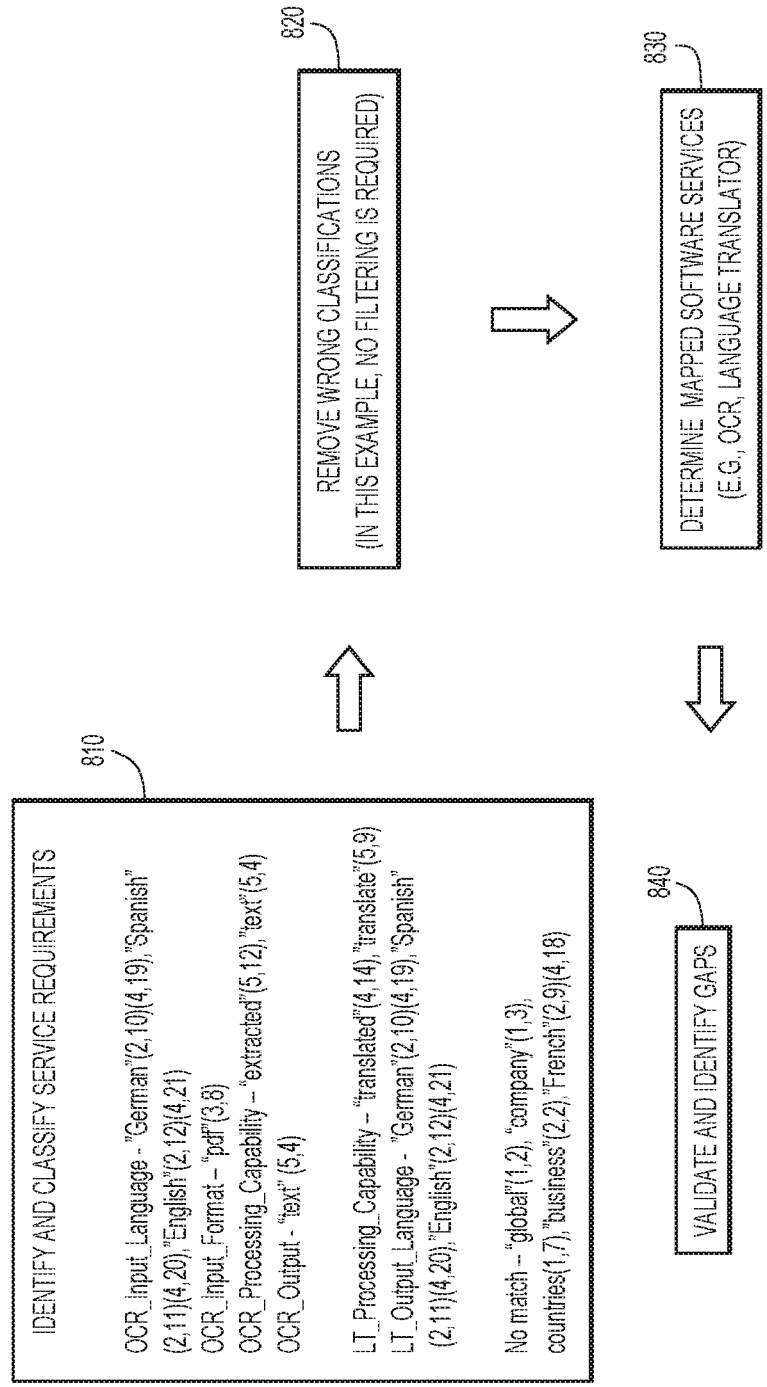
FIG. 9 is an example of using the automated software service analysis system to determine whether language translation is supported by existing software services, according to an embodiment of the present invention.

FIG. 9 shows an example workflow of determining whether existing software services may be mapped to a query input of automatically extracting and translating text in documents (scanned or text-readable), based upon the defined dictionaries.

At operation 810, a query input, in the form of text, is received. The text is analyzed using machine learning techniques, e.g., techniques that utilize natural language processing, to identify requisite software functionality and corresponding parameters/phrases to define the software functionality. The functionality and phrases may be classified to match one or more dictionary subcategories. For example, an query input may comprise the following text, that is analyzed using machine learning/natural language processing:

A global company operates in many countries. The business documents are generated in many languages, French, German, Spanish, and English. The documents are scanned and stored in pdf format. Since these documents can be accessed by anyone, it would need to be translated into other languages, such as French, German, Spanish, and English. For this, the software need is an automated extraction of text in the documents (scanned or text-readable), translate the text into the other desired languages, and create a new document.

The software services analysis system 15 may identify terms that match dictionary subcategories, including input languages, input format, processing capabilities, and outputs. These terms may be mapped to respective software services existing in the computing environment. Other terms, having no match, may be stored by the system, including global, company, countries, business, French, etc. Additionally, the position of the terms within the document are stored, allowing refinement of mappings based on co-location criteria. For example, (German 2, 10) corresponds to identifying the word German in the second sentence and the tenth term in the sentence.

At operation 820, incorrect classifications or matches are removed by the filtration engine 120. In this example, filtering is not needed. However, in other cases, the classified phrases will be evaluated to determine whether their position falls within specified co-location criteria. If the phrases fall outside the specified co-location criteria, a match to a particular subcategory will be removed. In cases in which mapping a requested service is dependent on a number of matches of subcategories in a dictionary, if the number of matches falls below a threshold specified in the service mapping criteria, the mapping may be removed.

At operation 830, mapped software services are determined. A service may be mapped to the requirement based on a number of subcategory matches during classification, e.g., service input, service processing capability, and service output is present in the classification.

At operation 840, gaps in mapped software services are identified. In this case, a gap is identified, French translation services, which is included in the input query but not mapped to a software service. This analysis may be performed after analysis of "no match" keywords.

In this example, the system may implement a French translator service to remedy the deficiency. Once identified, the requested services may be built by the system from the existing services, namely, by integration of the existing OCR service, language translator service (including the French language translator).

In some aspects, once the corresponding functionality (existing services) are identified, requested services may be built in an automated manner by the system.

Figure 10:
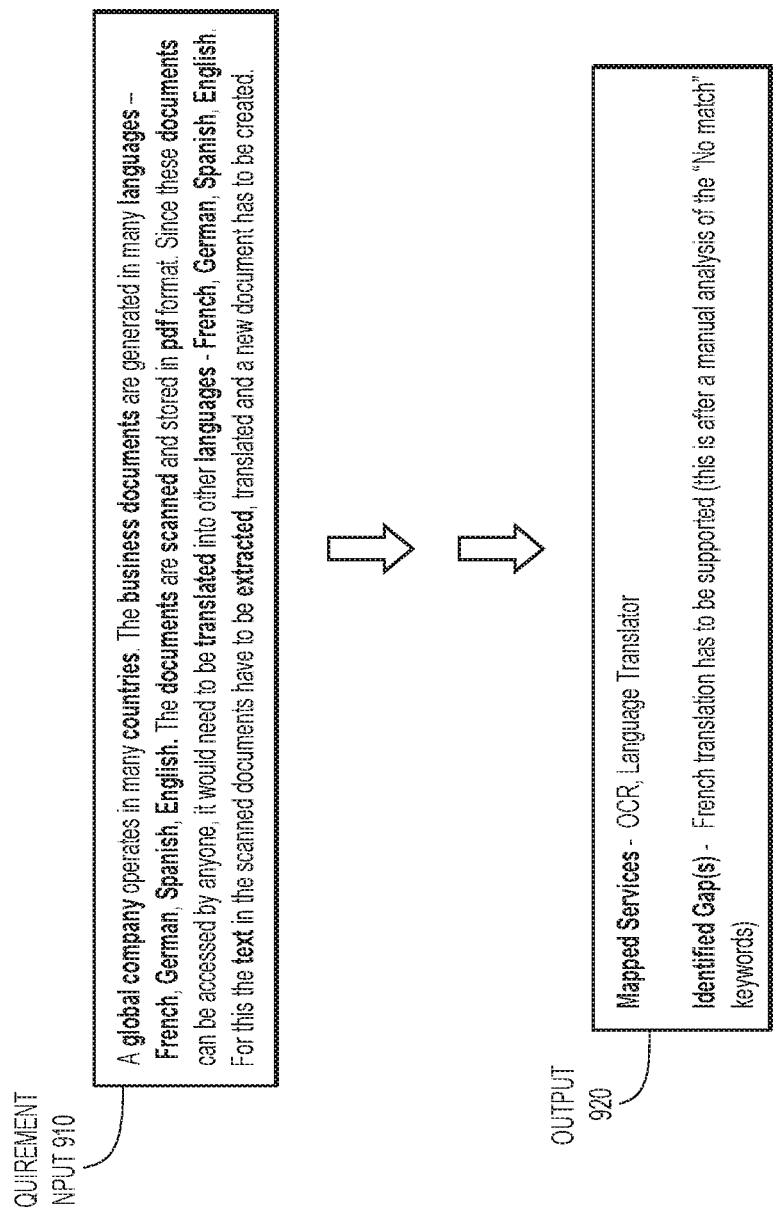
FIG. 10 shows example inputs and outputs of the system of FIG. 9, according to an embodiment of the present invention.

FIG. 10 shows an example of inputs and outputs that may be provided to the system described herein. For example, input 910 may include the query input that is provided to the system of FIG. 1, performing the operations of FIG. 9. Output 920 may be provided by the system, based on the generated dictionaries and the input query. As output, a listing of mapped software service and gap software services may be provided, as well as any other identified gaps.

Figure 11:
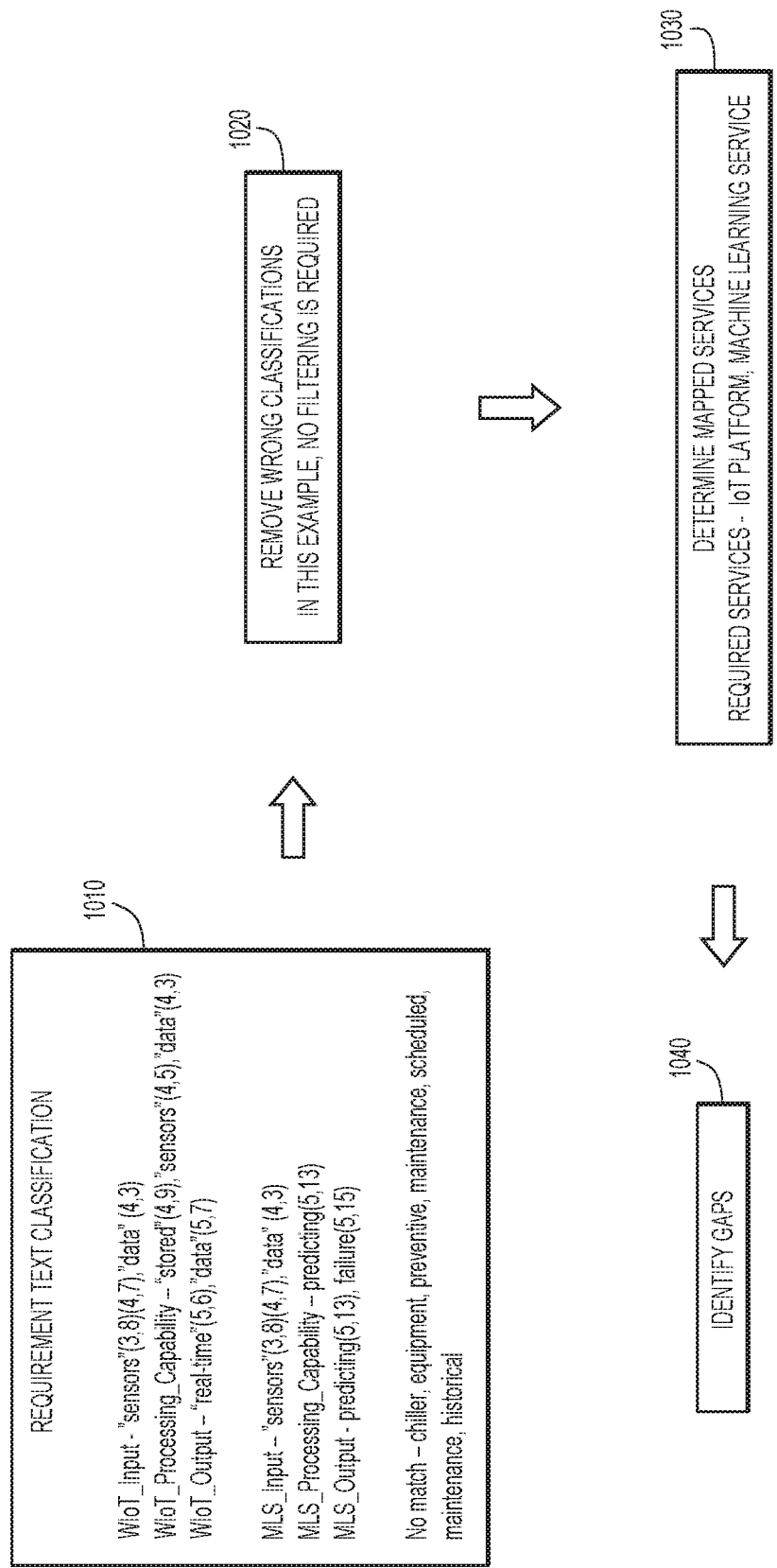
FIG. 11 is an example of using the automated software service analysis system to determine whether failure prediction is supported by existing software services, according to an embodiment of the present invention.

FIG. 11 shows another example workflow of determining whether software services are available in an existing computing environment, for an input query for predicting equipment failure. At operation 1010, the system may analyze the input query text:

A chiller is an equipment that costs a lot to repair if a failure occurs. It is important to perform preventive maintenance rather than scheduled maintenance to reduce the cost of failures and improve the efficiency. The chiller has a number of built in sensors that can be used to monitor the health of the chiller. The historical data collected from the sensors are stored in a database. The historical data and the real-time data needs to be analyzed for predicting the failure of the chiller.

The phrases, identified by NLP, may be classified into respective fields of dictionary subcategories by a machine learning system. The system may identify terms, including "sensors", "data", "stored", "real-time", "predicting/prediction", "failure", etc. The position of one word relative to another word may be tracked, for filtering based on co-location. For example, (sensors 3,8) corresponds to identifying the word sensors in the third sentence at position number eight of the sentence.

At operation 1020, incorrect classifications are removed by the filtration engine. At operation 1030, mapped services are determined as previously described. At operation 1040, gaps are identified, if needed. In this example, no gaps are identified indicating that the requested services may be built within the system from the existing services, namely, by integrating the IoT platform with the machine learning service.

In some aspects, once the corresponding functionality (existing services) are identified, requested services may be built in an automated manner by the system.

Figure 12:
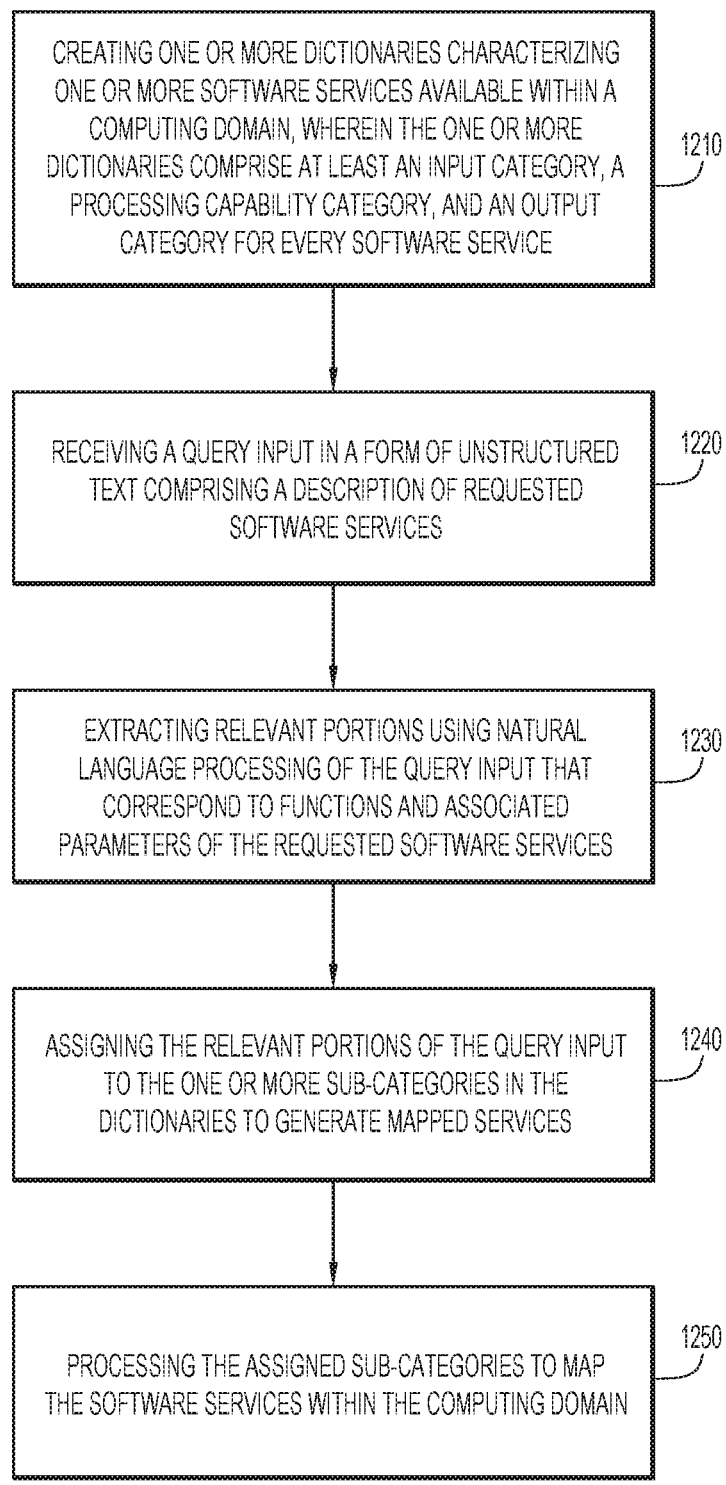
FIG. 12 shows a high level flowchart of the automated software service analysis, according to an embodiment of the present invention.

FIG. 12 is an operational flow chart showing high level operations of the techniques provided herein. At operation 1210, one or more dictionaries characterizing one or more software services available within a computing domain are created, wherein the one or more dictionaries comprise at least an input category, a processing capability category, and an output category for every software service. At operation 1220, a query input comprising a description of software solution is received. At operation 1230, using natural language processing, relevant portions of the query input that correspond to functions and associated parameters of the software services are extracted. At operation 1240, the relevant portions of the query input are assigned to the one or more sub-categories in the dictionaries to generate mapped services. At operation 1250, the sub-category assignments are processed to determine the mapping of the available software services within the computing domain. Once determined, the system may build the requested services based on the identified functionality of existing services.

Features of present invention embodiments include automated determination of queried software services and building a new software service with increased accuracy and speed. This approach leads to decreased time to market as well as reduced time to develop an integrated or custom software service and supporting architecture. Current approaches rely on subject matter expertise, which is time consuming and error prone, as an administrator may not be aware of the full spectrum of software services or of each available service (e.g., especially in cases where deployment of a service is limited to a few users). Present techniques improve the operation of a computing environment, allowing novel software services to be integrated based on re-useable services to generate novel customized services and solutions. In cases, where gaps are identified, the missing service (e.g., custom or drop-in) which performs the function of the identified gap in order to generate the requested functionality may be obtained. Additionally, the techniques provided herein allow for a system with machine learning capabilities and natural language processing to analyze unstructured text, classify the unstructured text to subcategories of a dictionaries to form a mapping that determines which software services are available within the present computing environment in an automated manner.

These techniques provide fine grained control over criteria for mapping input queries to each service level. For example, a functionality of an input query may be mapped with only one subcategory match or a combination of subcategory matches, provided that there are no gaps or that the gaps are limited (e.g., to one or two non-matching subcategories). This increases the accuracy of the match of every service to a requirement.

It will be appreciated that the embodiments described above and illustrated in the drawings represent only a few of the many ways of implementing embodiments for determining whether existing software services may be integrated to satisfy a user input query.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, automated software service analysis system 15, etc.). These systems may include any type of monitors and input devices (e.g., keyboard, mouse, voice recognition, etc.) to enter and/or view information.

It is to be understood that the software (e.g., automated software service analysis system 15, including a dictionary generation engine 105, a NLP engine 110, a text classification engine 115, a filtration engine 120, a service mapping engine 125, a feedback engine 130, and a flagging and alerts engine 135, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., automated software service analysis system 15, including a dictionary generation engine 105, a NLP engine 110, a text classification engine 115, a filtration engine 120, a service mapping engine 125, a feedback engine 130, and a flagging and alerts engine 135, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., automated software service analysis system 15, including a dictionary generation engine 105, a NLP engine 110, a text classification engine 115, a filtration engine 120, a service mapping engine 125, a feedback engine 130, and a flagging and alerts engine 135, etc.). The database system may be implemented by any number of any conventional or other databases, data stores or storage structures (e.g., files, databases, data structures, data or other repositories, etc.) to store information (e.g., dictionaries 32, combination criteria 34, exclusion criteria 36, co-location criteria 38, and service mapping criteria 39 etc.). The database system may be included within or coupled to the server and/or client systems. The database systems and/or storage structures may be remote from or local to the computer or other processing systems, and may store any desired data (e.g., dictionaries 32, combination criteria 34, exclusion criteria 36, co-location criteria 38, and service mapping criteria 39 etc.).

The present invention embodiments may employ any number of any type of user interface (e.g., Graphical User Interface (GUI), command-line, prompt, etc.) for obtaining or providing information (e.g., dictionaries 32, combination criteria 34, exclusion criteria 36, co-location criteria 38, and service mapping criteria 39 etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the automated software service analysis system 15 may include any information arranged in any fashion, and may be configurable based on rules or other criteria to provide desired information to a user (e.g., classification results, gap results, listing of software services, dictionaries, mapping of queries to software services, etc.).

The present invention embodiments are not limited to the specific tasks or algorithms described above, but may be utilized for any application in which automated analysis of service information is useful. Further, this approach may be generally applicable to mitigate any identifying or other information in any context, and is not limited to any particular application domain, such as manufacturing, health, or other domain.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing software services in a computing domain comprising:
   creating one or more dictionaries characterizing one or more software services available within the computing domain, wherein the one or more dictionaries each comprise at least an input category, a processing capability category, and an output category for every software service;
   receiving a query input in a form of unstructured text comprising a description of requested software services;
   extracting relevant portions using natural language processing of the query input that correspond to functions and associated parameters of the requested software services;
   assigning the relevant portions of the query input to one or more subcategories of the dictionaries to generate mapped services;
   removing a mapping of the relevant portions of the query input from the subcategories when extracted portions associated with the mapping include keywords or phrases exceeding a defined distance within the query input;
   processing the subcategories assigned with the relevant portions of the query input to map the requested software services to the one or more software services within the computing domain;
   identifying a missing requested software service that is unmapped to the one or more software services within the computing domain and obtaining a new software service that maps to the missing requested software service; and
   integrating the new software service and the software services that are mapped to the requested software services to generate a new service with the requested software services.

2. The method of claim 1, wherein the one or more dictionaries comprise keywords or phrases, combinations of keywords or phrases, or exclusions of combinations of keywords or phrases used in mapping the relevant portions to the subcategories of the one or more dictionaries.

3. The method of claim 1, further comprising:
   classifying extracted portions into the subcategories of the dictionaries using machine learning techniques.

4. The method of claim 3, further comprising:
   updating inputs to a classification algorithm that classifies the extracted portions into the subcategories of the dictionaries, based on feedback from a validation process that validates classifications.

5. The method of claim 1, wherein mapping further comprises:
   mapping a query input to an existing service, when an extracted portion corresponding to an input of the requested service is classified into an input subcategory of the dictionary and an extracted portion corresponding to an output of the requested service is classified into an output subcategory of the dictionary.

6. A system for processing software services in a computing domain, the system comprising:
   one or more processors;
   one or more computer readable storage media;
   program instructions stored on the one or more computer readable storage media for execution by at least one of one or more computer processors, the program instructions comprising instructions to:
      create one or more dictionaries characterizing one or more software services available within the computing domain, wherein the one or more dictionaries each comprise at least an input category, a processing capability category, and an output category for every software service;
      receive a query input in a form of unstructured text comprising a description of requested software services;
      extract relevant portions using natural language processing of the query input that correspond to functions and associated parameters of the requested software services;
      assign the relevant portions of the query input to one or more subcategories of the dictionaries to generate mapped services;
      remove a mapping of the relevant portions of the query input from the subcategories when extracted portions associated with the mapping include keywords or phrases exceeding a defined distance within the query input;
      process the subcategories assigned with the relevant portions of the query input to map the requested software services to the one or more software services within the computing domain;
      identify a missing requested software service that is unmapped to the one or more software services within the computing domain and obtain a new software service that maps to the missing requested software service; and
      integrate the new software service and the software services that are mapped to the requested software services to generate a new service with the requested software services.

7. The system of claim 6, wherein the one or more dictionaries comprise keywords or phrases, combinations of keywords or phrases, or exclusions of combinations of keywords or phrases to map the relevant portions to the subcategories of the one or more dictionaries.

8. The system of claim 6, wherein the program instructions further comprise instructions to:
   classify extracted portions into the subcategories of the dictionaries using machine learning techniques.

9. The system of claim 8, wherein the program instructions further comprise instructions to:
   update inputs to a classification algorithm that classifies the extracted portions into the subcategories of the dictionaries, based on feedback from a validation process that validates classifications.

10. The system of claim 6, wherein the program instructions further comprise instructions to:

map a requested service to an existing service, when an extracted portion corresponding to an input of the requested service is classified into an input subcategory of the dictionary and an extracted portion corresponding to an output of the requested service is classified into an output subcategory of the dictionary.

11. A computer program product for processing software services in a computing domain, the computer program product comprising one or more computer readable storage media collectively having program instructions embodied therewith, the program instructions executable by a computer to cause the computer to:

create one or more dictionaries characterizing one or more software services available within the computing domain, wherein the one or more dictionaries each comprise at least an input category, a processing capability category, and an output category for every software service;

receive a query input in a form of unstructured text comprising a description of requested software services;

extract relevant portions using natural language processing of the query input that correspond to functions and associated parameters of the requested software services;

assign the relevant portions of the query input to one or more subcategories to generate mapped services;

remove a mapping of the relevant portions of the query input from the subcategories when extracted portions associated with the mapping include keywords or phrases exceeding a defined distance within the query input;

process the subcategories assigned with the relevant portions of the query input to map the requested software services to the one or more software services within the computing domain;

identify a missing requested software service that is unmapped to the one or more software services within the computing domain and obtain a new software service that maps to the missing requested software service; and integrate the new software service and the software services that are mapped to the requested software services to generate a new service with the requested software services.

12. The computer program product of claim 11, wherein the one or more dictionaries comprise keywords or phrases, combinations of keywords or phrases, or exclusions of combinations of keywords or phrases to map the relevant portions to the subcategories of the one or more dictionaries.

13. The computer program product of claim 11, wherein the program instructions further cause the computer to:

classify extracted portions into the subcategories of the dictionaries using machine learning techniques.

14. The computer program product of claim 13, wherein the program instructions further cause the computer to:

update inputs to a classification algorithm that classifies the extracted portions into the subcategories of the dictionaries, based on feedback from a validation process that validates classifications.

\* \* \* \* \*